United States Patent [19]

Cocca

[11] Patent Number: 5,649,253
[45] Date of Patent: Jul. 15, 1997

[54] SELF CALIBRATION CIRCUIT FOR A CAMERA

[75] Inventor: J. David Cocca, Pittsford, N.Y.

[73] Assignee: Eastman Kodak Company, Rochester, N.Y.

[21] Appl. No.: 414,087

[22] Filed: Mar. 31, 1995

[51] Int. Cl.⁶ .......................... G03B 19/02; G03B 17/24
[52] U.S. Cl. ............................................ 396/392; 396/319
[58] Field of Search ....................... 354/458, 459, 354/460, 461, 206, 213, 212, 217, 218; 396/310, 311, 315, 319, 322, 404, 406, 392

[56] References Cited

U.S. PATENT DOCUMENTS

| | | | |
|---|---|---|---|
| 4,314,235 | 2/1982 | Ruf et al. | 340/347 |
| 4,423,934 | 1/1984 | Lambeth et al. | 354/412 |
| 4,498,140 | 2/1985 | Hull | 364/571 |
| 4,629,304 | 12/1986 | Saegusa | 354/432 |
| 4,996,549 | 2/1991 | Yamaguchi | 354/173.11 |
| 5,084,754 | 1/1992 | Tomitaka | 358/209 |
| 5,097,283 | 3/1992 | Kazumi | 354/412 |
| 5,229,810 | 7/1993 | Cloutier et al. | 355/40 |
| 5,268,562 | 12/1993 | Lazaridis | 235/462 |
| 5,291,112 | 3/1994 | Karidis et al. | 318/568.1 |
| 5,371,691 | 12/1994 | Seki et al. | 364/571.04 |
| 5,448,430 | 9/1995 | Bailey et al. | 360/77.12 |
| 5,477,286 | 12/1995 | Ohkawa | 354/21 |
| 5,508,767 | 4/1996 | Kazumi et al. | 354/106 |
| 5,521,666 | 5/1996 | Kazami | 354/170 |
| 5,530,503 | 6/1996 | Takahashi et al. | 354/173.11 |

FOREIGN PATENT DOCUMENTS 1096813  12/1967  United Kingdom ........... G01N 11/00

OTHER PUBLICATIONS

Mitsubishi Electronics America, Inc., "Microcontroller User's Manual", pp. 64–68, (Apr., 1991).
Schilling, Belove, *Electronic Circuits: Discrete and Integrated*, pp. 719–723, McGraw-Hill, Inc. (1979).
Horowitz, Hill, *The Art of Electronics*, 2nd. ed., pp. 622–624, Cambridge University Press.

*Primary Examiner*—Russell E. Adams
*Assistant Examiner*—Eric Nelson
*Attorney, Agent, or Firm*—Francis H. Boos, Jr.

[57] ABSTRACT

An event detection circuit and method of operation thereof in a calibration mode and in a normal operating mode particularly for use in photographic cameras in relation to the calibration of sensors and the detection of output signals therefrom for use in controlling camera operations. An event detection circuit comparator is used in the calibration mode with a successive approximation A/D converter register which generates test analog signals applied to a second input terminal of the comparator while the sensor test output signal generated under the calibration test conditions is applied to the first input terminal to measure and digitize the sensor test analog output signal level as a digital threshold. Then, in the normal operating mode, the digital threshold is retrieved and substituted for the successive approximation A/D converter register to generate a threshold analog signal applied to the second input terminal while the sensor analog output signal is applied to the first input terminal.

13 Claims, 4 Drawing Sheets

SELF CALIBRATION CIRCUIT FOR A CAMERA

CROSS-REFERENCE TO RELATED APPLICATIONS

Reference is hereby made to commonly assigned copending U.S. patent application Ser. No. 08/200,175 filed Feb. 22, 1994, for PHOTOGRAPHIC CAMERA AND METHOD FOR RECORDING MAGNETIC DATA ON FILM in the name of J. David Cocca.

FIELD OF THE INVENTION

This invention relates to event detection circuits and methods of operation thereof in a calibration mode and in a normal operating mode particularly for use in photographic cameras in relation to the calibration of sensors and the detection of output signals therefrom for use in controlling camera operations.

BACKGROUND OF THE INVENTION

In commonly assigned U.S. Pat. Nos. 4,423,934, incorporated herein by reference, a photographic camera with a digital, microcomputer-based control system is described for controlling various camera operations. As described therein, such a camera is equipped with a number of transducers or sensors and user operated input switches which feed digitized input signals to the microcomputer at certain times representing the detection of events or conditions during the initiation of and through completion of an exposure. Such cameras are provided with scene light condition measuring sensors for providing scene light signals to the microcomputer for automatic exposure control. In addition, auto range finder sensors are provided for estimating the distance to an object in the scene aimed at by the user and for setting the lens focus accordingly, as are well known in the camera art. These and other condition sensors, switch inputs and digitally controlled camera operations are described in the '934 patent.

In addition, cameras are commonly provided with reversible motorized film advance mechanisms operated by the microcomputer based control system for advancing the filmstrip to the next image frame on completion of an exposure and for rewinding the entire filmstrip into its cartridge when all exposures are completed. Various types of metering systems are employed to control the frame advance to avoid overlapping frames or too wide a spacing between adjacent exposed image frames. In this process, filmstrip sprocket hole or perforation event detect opto-sensors are employed to detect the passage of the perforations as the filmstrip is advanced.

More recently, it has been proposed to provide a filmstrip having a magnetic layer on the non-emulsion side so that data may be recorded in or reproduced from tracks on the magnetic layer by magnetic heads in the camera and/or in photofinishing equipment. Commonly assigned U.S. Pat. No. 5,229,810, for example, discloses such a filmstrip having a magnetics-on-film (MOF) layer and a camera system utilizing the filmstrip. A variation on the filmstrip disclosed in the '810 patent is disclosed in my above-referenced '175 application. In such systems, it is necessary to provide a metering system for controlling particularly the recording of information in a track or tracks of the MOF layer during each frame advance while also controlling the metered distance the filmstrip is advanced. The metering system employs analog output signals generated by film perforation opto-sensors positioned in the filmstrip advance path in response to passage of one or more perforations past the sensor(s) during each frame advancement.

In all such systems, variances in system performance can result from variances in the sensor signal response to the measured variable and variances in the response of the electro-mechanical mechanism to a control signal from the microcomputer. In other words, the microcomputer can only perform the system operating algorithms it is programmed to perform, and system response is dependent on the accuracy of the sensor input signals and the responsiveness of the controlled mechanisms.

In the manufacture of such automatic, computer controlled cameras, it is desirable to be able to specify component performance, e.g. sensor performance, with as wide tolerance specifications as feasible, so that parts costs are kept reasonable. Such sensors can include the perforation sensors for filmstrip metering, the range finding sensor, a photovoltaic sensor or sensor array elements for auto exposure calculation in natural light or for controlling the decision to employ artificial (flash) illumination, and (optionally) for flash control feedback, and any other camera sensors that generally provide an analog output signal that must be digitized for use by the microcomputer in one of the camera system operations. For similar reasons, it is desirable to be able to specify rather loose tolerances of operating mechanisms, e.g. the aperture and blade mechanisms, the lens focus drive mechanism and the filmstrip advance mechanism.

As a result, performance in post-assembly tests of the affected camera systems can vary widely from camera to camera. As set forth in the above referenced '934 patent, as long as the particular camera system performance is within specification, the performance can be compensated for. Typically, such compensation involves adjustments to the sensor response at the output of the sensor, e.g. by trimming the response to one or more test conditions mimicking the condition or event to be detected to achieve either a target output signal level or the desired downstream target response by the controlled mechanism. Component trimming requires access to the camera circuits, is time consuming and costly, and results in some loss of product.

The manner of compensation proposed in the '934 patent is to operate the camera in a final camera assembly and quality control operation using a nominal parameter control program. The camera sensors and component mechanisms are exercised using a set of nominal control constants, and the system responses, i.e., the test output signal level or controlled operation response, are recorded. The errors from specified values are computed, and corresponding correction values are also computed. The digitized correction values are stored in memory in the camera microcomputer and are called up and employed to offset the digitized sensor output signal or to compensate for variations in settings achieved or operating times of the mechanisms during normal use of the system.

Problems to be Solved by the Invention

The '934 patent represents a significant improvement over the prior approach. However, it also involves the use of a test set-up and an external computing and programming operation that communicates data and commands between the computer and the camera. The camera must be in some state of disassembly for connections to be made to the camera circuitry.

The invention is directed to solving the above stated problems in the manufacture and testing of cameras and other equipment.

SUMMARY OF THE INVENTION

It is therefore a primary object of the invention to provide a simplified event or condition detection circuit (hereafter "event detection") and method of calibration thereof with respect to the output signal of a sensor.

It is a further object of the present invention to provide such an event detection circuit responsive to a sensor wherein calibration of the sensor or the event detection circuit can advantageously be done without the use of external equipment other than that necessary to expose the sensor to the test condition and derive the sensor test analog output signal.

It is yet a further object of the invention to provide such a simplified event detection circuit and method of operation that provides for minimal processing time for the event detection in the normal operating mode.

It is finally a further object of the invention to provide a self calibration mode circuit that shares circuit components with the event detector in the normal operating mode.

These and other objects of the invention are realized in a calibration method and circuit for calibrating an event detection circuit for detecting an event from the magnitude of an analog output signal of a sensor comprising the steps of and means for:

in a calibration mode: operating the sensor to provide a test analog output signal in response to a test condition representative of the detection of an event; determining the magnitude of the analog output signal as a digital threshold; and storing the digital threshold; and in a normal operating mode: selecting and operating the sensor to provide a sensor analog output signal having a magnitude varying as a function of the time varying event to be detected; retrieving the stored digital threshold; converting the stored digital threshold into an analog threshold and comparing the sensor analog output signal to the analog threshold and providing an event detection output signal when the sensor analog output signal matches the analog threshold.

The invention is preferably practiced in respect to event detection circuits for responding to sensors of the type described above employed in cameras. In accordance with the preferred embodiment of the invention, an event detection circuit comparator is used in the calibration mode with a successive approximation A/D converter register which generates test analog signals applied to a second input terminal of the comparator while the sensor test output signal generated under the calibration test conditions is applied to the first input terminal to measure and digitize the sensor test analog output signal level as a digital threshold. Then, in normal operations, the digital threshold is retrieved and substituted for the successive approximation A/D converter register to generate a threshold analog signal applied to the second input terminal while the sensor analog output signal is applied to the first input terminal.

In accordance with the present invention, a simplified event detection circuit responsive to one or more sensors and a method of operating the circuit in a self calibration and normal operating mode is provided. The method of calibration can advantageously be done without the use of external equipment other than that necessary to expose the sensor to the test condition, e.g. the test illumination level or test detection strip. There is no need to physically trim threshold setting components of the event detection circuit for each sensor. Normal operating mode thresholds for one or more sensors can be selectively determined and stored in the operating system memory.

In normal operation, the thresholds for the sensors can be retrieved for use. The same circuit components are employed to compare the retrieved threshold to the sensor analog output signal level.

Because of time constraints of the available signal processing time for certain sensors, the time consuming A/D conversion of a sensor analog signal level and the comparison of the digitized signal to a stored digital threshold is to be avoided. In accordance with the present invention, the simplified event detection circuit conducts an analog comparison after D/A conversion of the retrieved digital threshold. Therefore, processing time for the event detection is minimized.

BRIEF DESCRIPTION OF THE DRAWINGS

These and other objects, advantages and features of the invention will become apparent from the detailed description given hereinafter in relation to the accompanying drawings, in which.

DETAILED DESCRIPTION OF THE PREFERRED EMBODIMENTS

Figure 1:
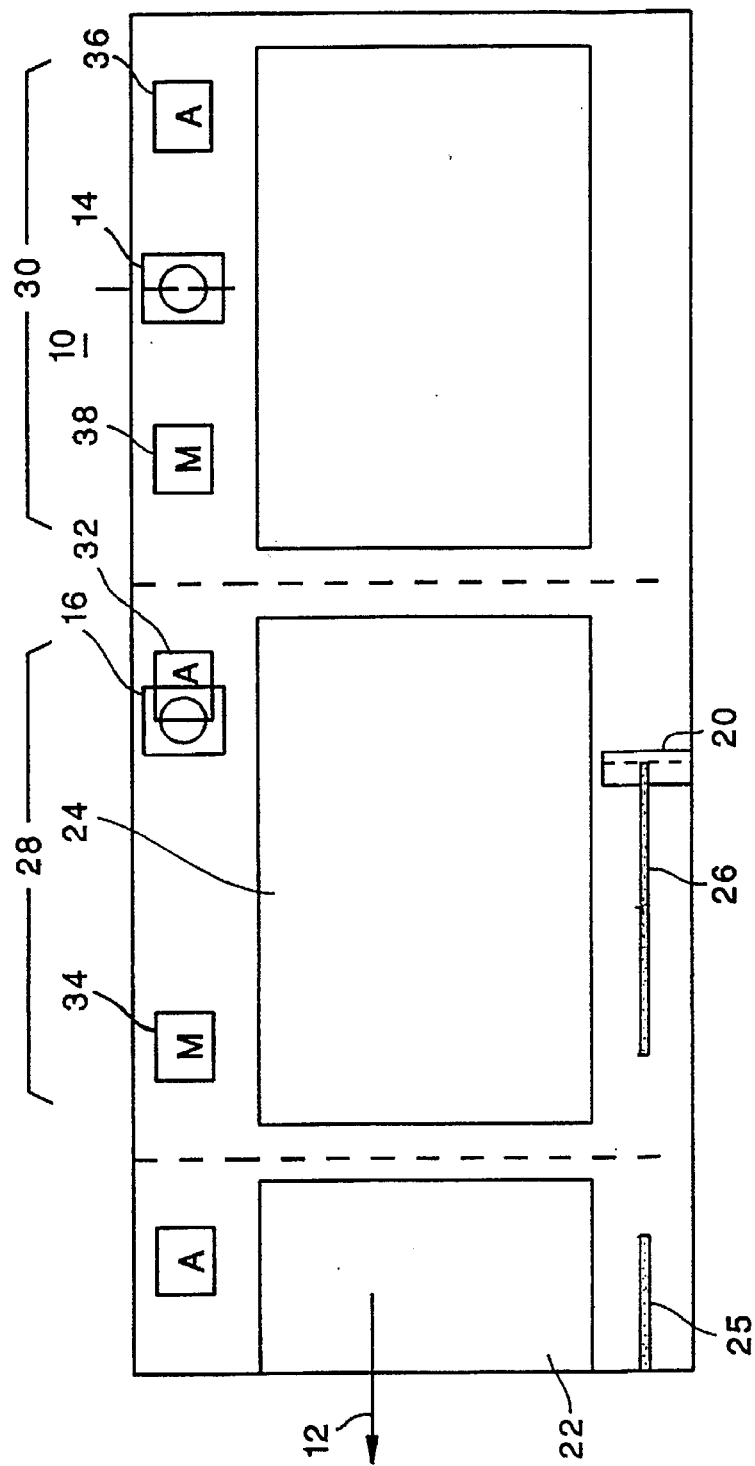
FIG. 1 is a schematic illustration of a photographic filmstrip in a camera in relation to perforation opto-sensors and a magnetic read/write head, wherein the opto-sensor photocells require calibration.

The present invention may be practiced in the self calibration of a number of sensors of cameras of the type described above and particularly in the calibration of the output signals of light sensors and position or motion sensors that rely on the interruption of a light beam. Typical camera light sensors include a single photovoltaic sensor or an array of such sensors used in auto exposure control systems and in range finders as described in the above-incorporated '934 patent. In a very simple camera calibration context, the auto-ranging and auto exposure photovoltaic cells or array signal output may be tested at a single light intensity threshold and calibration signals for the response to this condition be determined therefrom.

In another example, a photovoltaic sensor may be employed to determine if the ambient scene light is above or below a threshold illumination level for triggering artificial illumination. The sensor signal output response to the threshold illumination level must be determined and calibrated. Then the sensor may be employed in the event detection circuit to detect this condition.

Opto-sensors used for motorized filmstrip advance metering are disclosed in the above-referenced '175 application and preferably employ a tightly focused infrared light source, e.g. an IR LED mounted on one side of the camera filmstrip transport path behind a narrow aperture. A photocell is mounted on the other side of the filmstrip to be exposed to the IR LED beam when the filmstrip is not interposed therebetween. Therefore, when a filmstrip sprocket hole or perforation moves with transport of the filmstrip between the IR LED and the photocell, the perforation event can be detected by the relative change in the photocell output signal from that generated when filmstrip blocks the light.

Other, reflection type, opto-sensors may be employed to read encoded data on the filmstrip cartridge or a disk or the like associated with the cartridge for use in camera control. The event to be detected in this case is a code pattern which may signify data.

All of these sensors are intended to provide a "high" or "low" or 1 or 0 output signal that can be used as event detectors for various control functions. The analog voltage output signals, generated in response to a test light intensity condition, of samples from lots of planar and linear photovoltaic cells or arrays specified for scene object light level or for auto ranging, or the discrete photocells of opto-sensors, may vary in wide ranges. In the specific case of opto-sensors, the IR LEDs may also range in output intensity, so that the combination of light intensity range and photosensor response may vary considerably from unit to unit. For example, the Stanley Electric Co, Ltd. AN501-6 GaAs IR LED and PS5022-6 NPN silicon photo transistor can be paired as one preferred opto-sensor for detection of filmstrip perforations. The LED has a specified emitter light output (axial radiant intensity) that ranges between 6.0–15.0 μW/sr at the specified operating voltage, whereas the photo transistor has a photo current response in the range of 1.2–4.2 mA to a specified light intensity. The resulting total variation from opto-sensor to opto-sensor is approximately 8.5X.

Therefore, the sensor analog output signal response to the specific event that is intended to be detected may vary considerably, and it is necessary to effect a calibration to the threshold of the event to be detected. The following description of one preferred embodiment of the invention is specifically related to the context of filmstrip perforation opto-sensor calibration and detection, although the invention will be understood to be applicable to other event (including condition) detectors of the types described above.

Figure 2:
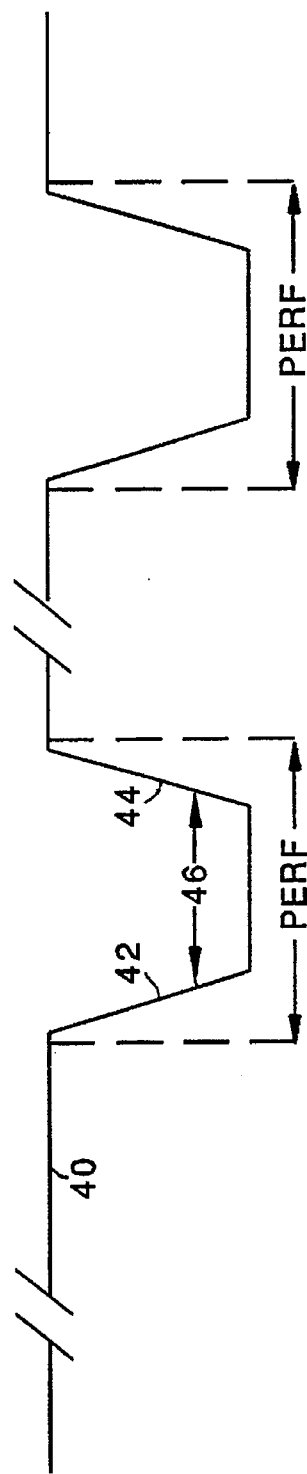
FIG. 2 is a waveform of the output signals of an opto-sensor photocell of FIG. 1.

FIGS. 1 and 2 provide an example of the opto-sensors for detecting filmstrip position and velocity during advancement of the filmstrip to aid in magnetic recording on an edge region track in a camera. The filmstrip 10 is depicted schematically as it is advanced in the direction of arrow 12 past the leading and trailing perforation opto-sensors 14 and 16, respectively, along a first filmstrip edge region and past the magnetic record head 20 positioned along the second filmstrip edge region. A first image frame 22 has a first track 25 already recorded in the MOF layer alongside it by the magnetic head 20. In the filmstrip position depicted, a second image frame 24 is currently being advanced, and the magnetic head 20 is recording a corresponding second track 26.

In order to control the advance of filmstrip 10 and the recording in the tracks, it is desirable to derive output signals from both opto-sensors 14 and 16 detecting the leading and trailing edges of image frame pairs 28, 30 of perforations 32, 34 and 36, 38, respectively. The "anticipation" perforations ... 32, 36, ... precede the "metering" perforations ... 34, 38 ... in the series of pairs ... 28, 30, ... along the first edge region. As explained in greater detail in the '175 application, the successive detections of the leading and trailing edges of each perforation pair, e.g. pair 28, by the opto-sensors 14 and 16 governs the starting and stopping of the recording operation in the related image frame track, e.g. track 26, as well as the filmstrip advance motor drive for advancement of the image frames. The full description of the operation is not material to the present invention, but the precision achieved in the leading and trailing edge detection by the opto-sensor self calibration of the present invention is important to the accuracy achieved.

Turning to FIG. 2, it illustrates a pair of output signals of the opto-sensors 14 or 16. In the absence of a perforation, the sensor analog output signal 40 is high, since the photocell is not rendered conductive by the IR LED beam. The IR LED beam is blocked by the IR absorbing or reflecting film layers. However, when the IR LED beam is unblocked by the passage of a perforation, the output signal 40 goes low as the photocell conducts. As the perforation leading and trailing edges pass across and interrupt the IR LED beam, the signal level changes as shown at the transition signal levels 42 and 44 of the sensor analog output signal 40.

In use in the camera, the sensor analog output signal 40 is digitized and compared to a digital threshold. Ideally, the output signal 40 would conform to a specified value, when high, and the transition signal levels would fall to and rise from a zero voltage level. The idealized threshold for the high-low edge detection would be set at a percentage of the difference, e.g. at the threshold signal level 46 in the transition signal levels 42 and 44 of the sensor analog output signal 40. In order to ensure that the signal level 46 is consistent in each camera manufactured, it would be necessary to provide a trim resistor value for each photocell of each opto-sensor. Alternatively, the output signal level would have to be calibrated in the manner disclosed in the '934 patent.

In this regard, such a calibration approach would still result in the sensor analog output signal being digitized and compared to a digital threshold value in the microcomputer of the camera electronic control unit. Such an operation is complex and consumes valuable processing time at a point where the microcomputer would be better employed in other camera processing and control functions.

Figure 3:
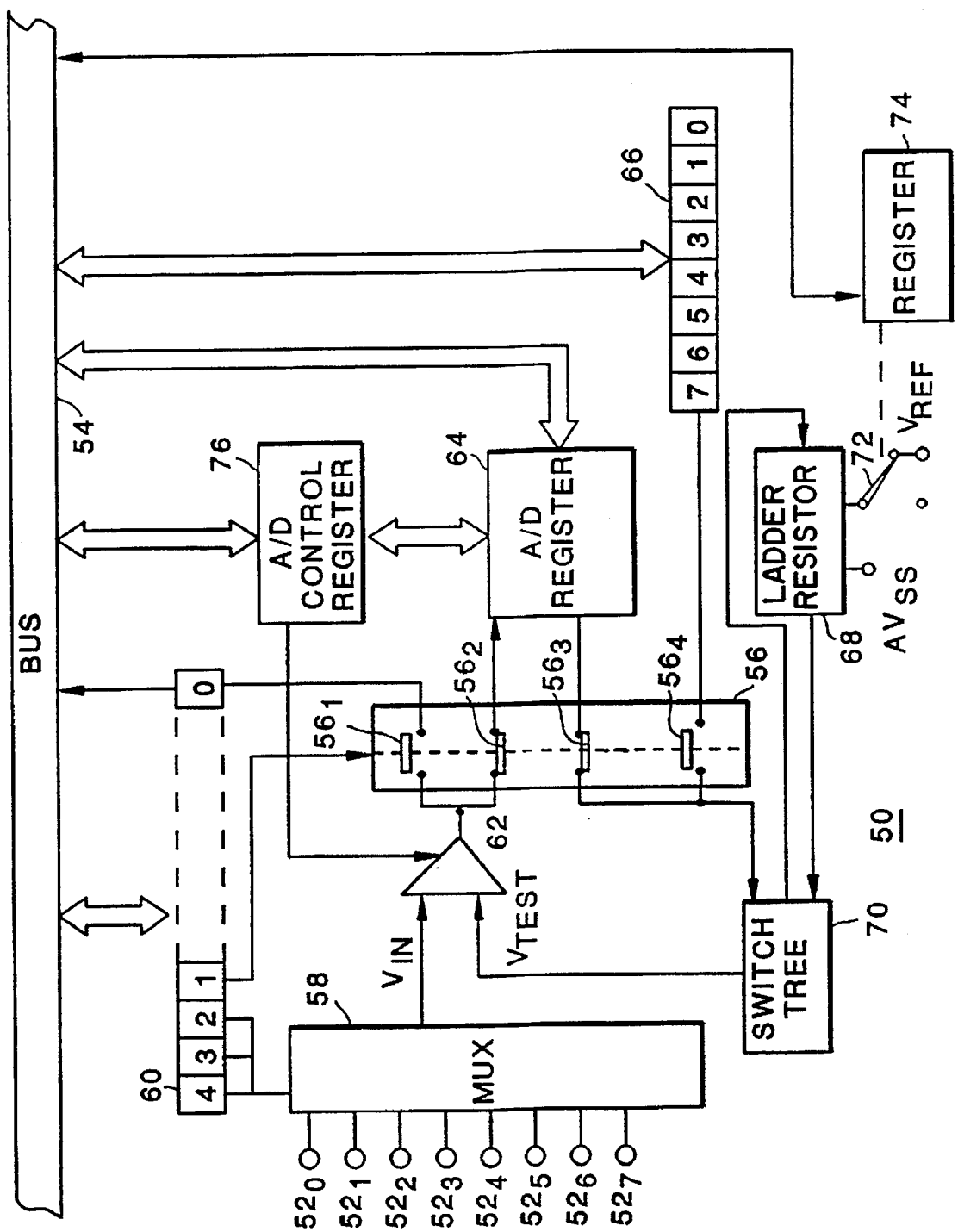
FIG. 3 is a circuit diagram of the self calibration and ADC circuit of the present invention in a camera self calibration mode.
Figure 4:
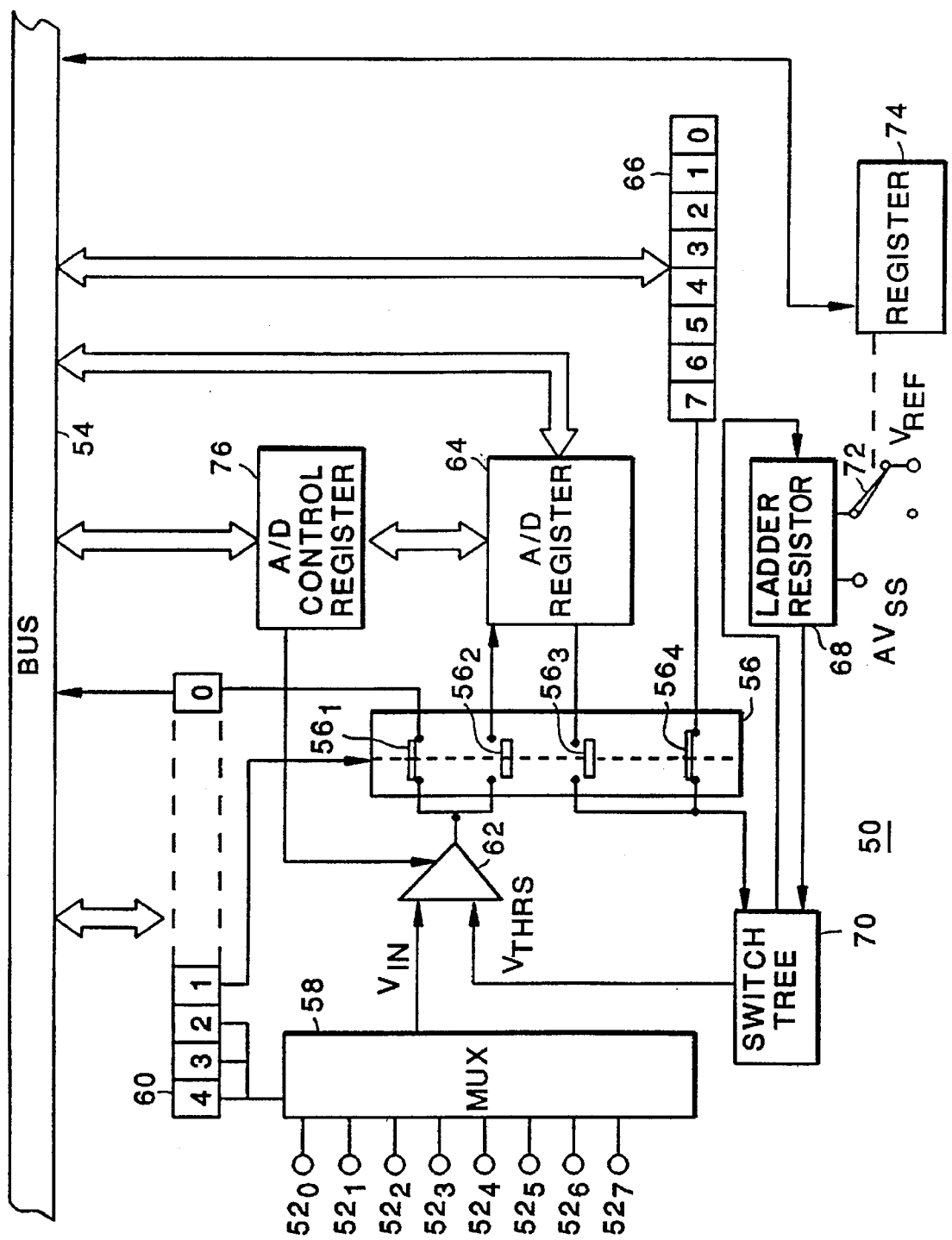
FIG. 4 is the circuit diagram of the self calibration and ADC circuit of the present invention in the normal camera operating mode.

Turning to FIGS. 3 and 4, it depicts a event detection circuit 50 of the present invention having self calibration and comparator capabilities that may be built into the camera and communicate with the camera electronic control system via bus 54 in accordance with the present invention. The circuit 50 is shown in the self calibration or SELF CAL mode in FIG. 3 and in the normal operating mode in FIG. 4. In the depicted embodiment, the circuit 50 incorporates elements of an A/D converter or ADC in the Model M37410M4 microcontroller available from Mitsubishi Electronics America, Inc., as shown in FIG. 2.8.1 of the Microcontroller User's Manual (April 1991). The ADC of that microcontroller may be employed to selectively effect the A/D conversion of a number of analog signals applied at the eight depicted input terminals $52_0$ –$52_7$ and provide the digitized value to the microcomputer through the data bus 54. In operation, the Mitsubishi ADC circuit does not provide a threshold matching operation to provide a high-low or 1 or 0 output but operates as a conventional A/D converter using successive-approximation conversion through an appended D/A converter.

Figure 5:
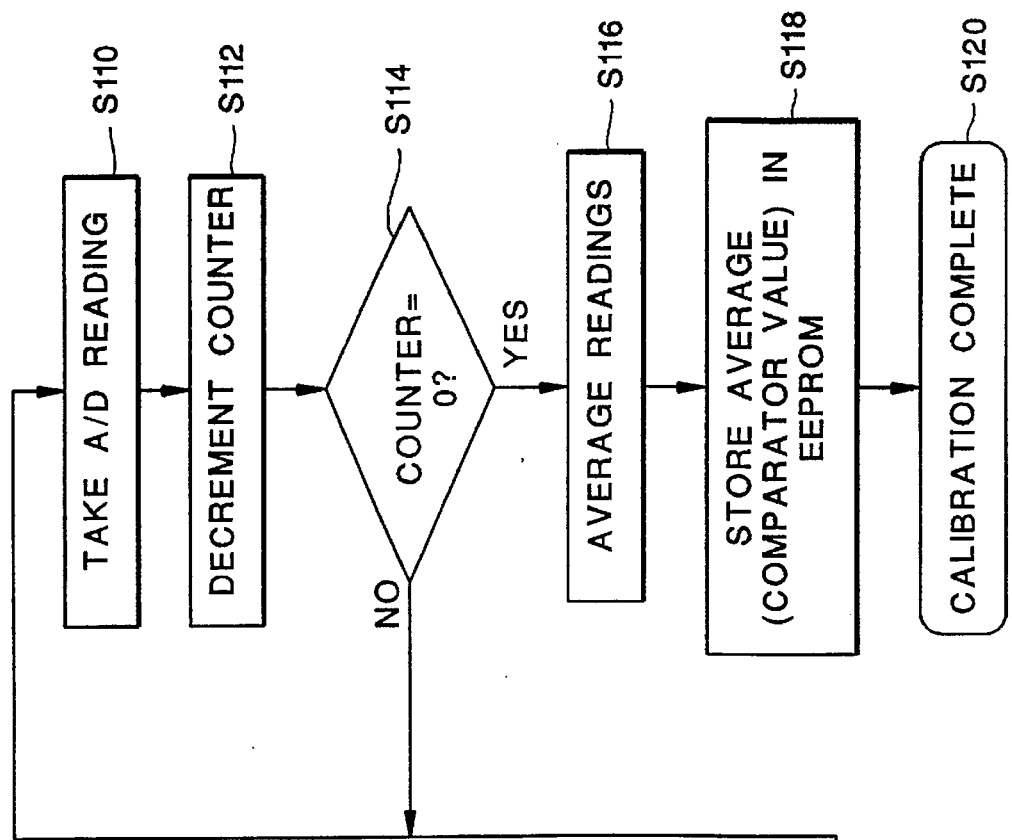
FIG. 5 is a flow chart of the self calibration mode employing the circuit of FIGS. 2 and 3 in relation to the perforation opto-sensor photocell output signal levels.
Figure 5:
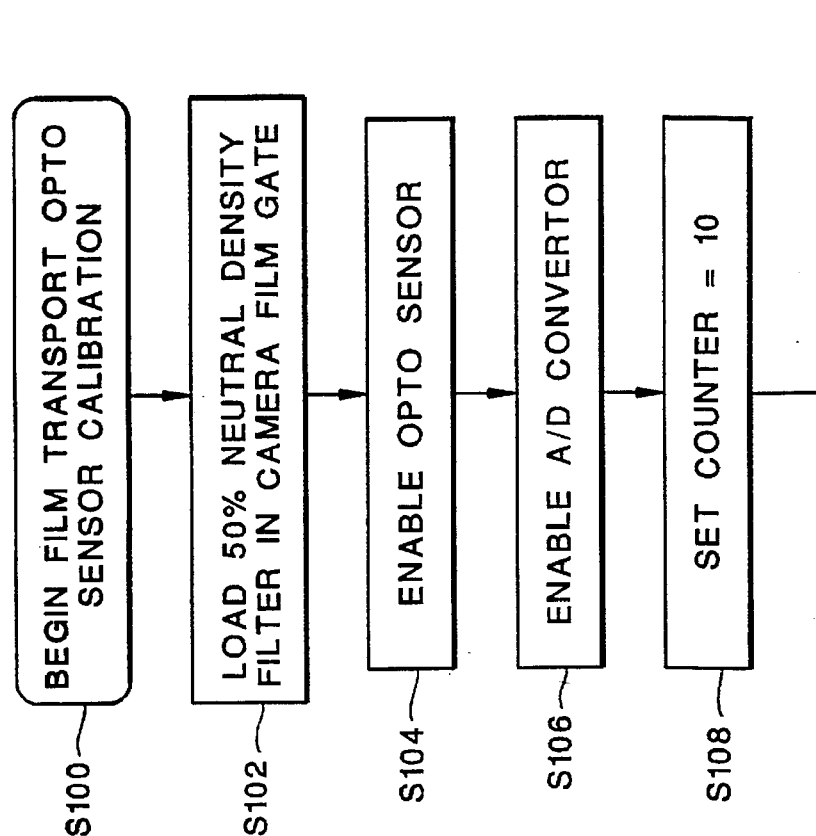

In accordance with the present invention, the flow chart of FIG. 5 is followed in the SELF CAL mode for each sensor or event detector output analog signal derived when the sensor is tested under a specified test condition and with the solid state switches $56_1$–$56_4$ of switch block 56 in the open and closed arrangement of FIG. 3. The A/D converted calibration values or digital thresholds for each sensor are derived in a successive-approximation conversion mode and transmitted on bus 54 to the camera control system microcomputer memory for storage and retrieval during the normal camera operating mode of FIG. 4.

In such normal use, the calibration derived digital threshold is retrieved from memory by the camera operating program as each respective sensor coupled to the input terminals $52_0$–$52_7$ is polled in the camera picture taking sequence. Each digital threshold is converted to an analog value by the D/A converter and used as the analog threshold for comparison to the sensor analog output signal. The comparator output signal generated from the comparison is transferred to the bus 54 from stage b0 of register 60 as a 1 (for example) when the sampled sensor analog output signal exceeds or matches the analog threshold. This approach works well with analog signal levels that are changing during the sample period, e.g. the changing sensor analog output signal during transitions 42 and 44 of FIG. 2.

The components of the event detection circuit 50 of FIGS. 3 and 4 include a channel or input signal selector MUX 58 which operates as a multiplexed analog signal switch in response to the bit values from the microcomputer (not shown) received through bus 54 and written into stages b2, b3 and b4 of the switch control register 60. A sensor output signal at terminals $52_0$–$52_7$ is selected by the bit values and switched through MUX 58 to be connected to one input terminal of comparator 62 as Vin. The output of comparator 62 is applied in a first branch through switch $56_1$, when closed, to stage b0 of switch control register 60 to set that stage bit value to 1 or 0 as described below in reference to FIG. 4. The output of comparator 62 is alternately coupled through switch $56_2$, when closed, to an A/D register 64 as shown in FIG. 3 that operates as a successive-approximation counter in the calibration mode of the event detector circuit 50. An A/D control circuit 76 may include a counter and provides a clock signal to the comparator 62 and the A/D register 64 and writes dummy data to the A/D register 64 to begin the successive-approximation conversion process.

In the successive-approximation conversion during the SELF CAL mode, a D/A conversion of successive digital bytes loaded into the A/D register 64 is effected employing the switch tree 70 and ladder resistance network 68 to apply successively approximated analog test signals Vtest to the comparator 62. When a match is achieved, the byte loaded in the A/D register 64 is stored in microcomputer memory as the digital threshold for the particular sensor under test. The stages of the successive approximation A/D register 64 are coupled to switch tree 70 when switch $56_3$ is closed in FIG. 3 during the self calibration process. Switch tree 70 is a solid state switching network that responds to an 8-bit input command to close and open semiconductor switches of the ladder resistor network to provide up to 256 different resistances. The schematically illustrated solid state switch 72 is closed to $V_{REF}$ by a command provided to one-bit, switch control register 74. Current flowing from $V_{REF}$ to isolated battery analog ground potential $AV_{ss}$ through the switched-in resistance develops each voltage Vtest applied to the second input terminal of the comparator 62 in the SELF CAL mode.

Successive approximation D/A converter operation is well known, and explanations may be found in textbooks for circuits other than the above-described Mitsubishi ADC. For example, reference is made to pp. 719–723 of *Electronic Circuits: Discrete and Integrated*, Schilling, Belove, 1979, McGraw-Hill, Inc. and pp. 622–624 of *The Art of Electronics*, Horowitz, Hill, Cambridge University Press. The process involves successively dividing in half the voltage range in which the comparator has placed the unknown voltage being converted. The A/D register 64 is first loaded so that the MSB is set to one, all other bits set to zero. This digital test value is converted to an analog voltage corresponding to half the test analog voltage range by the D/A converter (switch tree 70 and ladder resistance network 68) and applied to the comparator 62 as $Vtest_1$. When the result of the comparison is $Vtest_1$<Vin, then the MSB stays 1; otherwise it is set to 0. The comparisons are continued from the MSB to the LSB, whereupon the resulting digital byte is stored in memory via bus 54 under control of A/D conversion circuit 76 as the digital threshold for the respective sensor.

As described below, a number of such A/D conversions may be repeated to store a number of such digital threshold bytes. The number of digital threshold bytes may be averaged to derive the final digital threshold.

In normal camera use, the event detection circuit 50 is configured as shown in FIG. 4 with switches $56_1$ and $56_4$ closed. It should be noted that when the sensor outputs are not being monitored or polled, the camera microcomputer provides a switch open signal to one-bit control register 74 to remove $V_{REF}$ from the ladder resistance network 68 to save power. In the normal operating mode illustrated in FIG. 4, and when the sensors being polled at terminals $52_0$–$52_7$ are those providing a binary 1 or 0 output, the camera microcomputer provides the bit command to the one-bit control register 74 that effects closure of the solid state switch 72.

In addition, switch tree 70 is coupled to the eight-bit threshold register 66 when switch $56_4$ is closed in the normal camera operation. In this case, the byte loaded into register 66 is applied to the switch tree 70 which closes the corresponding ladder resistance network 68 switches and applies the resulting analog threshold voltage level to the second input terminal of the comparator 62. The byte loaded into threshold register 66 is the previously stored digital threshold for the particular sensor coupled to the first input terminal of comparator 62 on closure of the respective control switch in MUX 58.

In such normal camera operation, the microcomputer is programmed to follow a camera control algorithm which successively enables the energization of the above described sensors and switch inputs and controls camera systems in a picture taking sequence. Usually the picture taking sequence is initiated by a user depressing the image capture button to a measure position in a manner well known in the art. In the particular example illustrated in FIGS. 1 and 2, an exposure has been taken, and the exposure conditions are being recorded by the magnetic head 20 in the track 26 during advancement of the filmstrip to the next image frame. The particular operating sequence is described more completely in the above-referenced '175 application and is not important here. The edge detect output signals of the photocell of the leading opto-sensor 14 for both the metering and anticipation perforations 38 and 32 have already been detected during closure of the switch in MUX 58 coupled to the input $52_1$ and loading of the detection threshold byte in comparator control register 66 from microcomputer memory. The edge transitions have been stored as timing markers and employed in commencing recording in the track 26.

The leading edge of the anticipation perforation 32 is just being detected by the trailing opto-sensor 16 and recording in track 26 is completing. The edge detects of perforation 38 will be used to halt filmstrip advance in direction 12. At this point in time, the trailing opto-sensor 16 is enabled, and, as described above, the edge detection byte digital threshold for its photocell is loaded into comparator control register 66 and switches 56₁, and 56₄ are closed. The D/A conversion of the byte is effected to provide the analog threshold Vthrs to the comparator reference input terminal. The comparator 66 output is therefore connected to the stage b0 of switch control register 60, and a 1 is written in when the comparator 66 output goes high on the edge detection.

Turning to FIG. 5, it illustrates the steps of the SELF CAL mode for the perforation opto-sensors 14 and 16 of FIG. 1 in the final stages of assembly and testing of a camera. In step S100, the process is entered in the camera microcomputer. The microcomputer enters the SELF CAL mode and is prepared to download specific commands on the bus 54 to the switch control registers 60 and 64 and the A/D control circuit 76 to commence the successive-approximation conversion.

In step S102, a 50% neutral density filter is inserted in the camera in the filmstrip transport path and between the IR LEDs and photocells of each opto-sensor 14 and 16. The 50% neutral density filter is stationary and attenuates the amount of the IR LED light that passes through it by an amount mimicking the transition of the perforation edge cutting across the IR LED beam. In other words, the filter attenuates the IR LED beam by the amount that a perforation edge would attenuate it if it were positioned to attenuate the signal to the trip point or threshold signal level 46 of FIG. 2. This test condition for calibration purposes obviates the need to precisely place a perforation edge into the IR LED beam for each camera.

In step S104, the opto-sensors are enabled. The opto-sensor photocell outputs are already coupled to input terminals 52₁ and 52₂, for example, and the IR LEDs are normally energized by the camera battery when a filmstrip is loaded and while it is being advanced through the filmstrip transport path, typically by an automatic filmstrip advance mechanism. In the present case, the opto-sensors may be energized by a test command which can be entered to a test point on the electronic control circuit through a camera body panel opened during the SELF CAL mode.

In step S104, the selected input 52₁ or 52₂ of the MUX 58 is closed by a downloaded word to stages b2, b3, b4 of switch control register 60 from the microcomputer via bus 54. In this manner, the photocell output signal level from the IR LED light transmitted through the neutral density filter is applied to the first input terminal of the comparator 62 as Vin.

In step S106, the A/D converter 64 is enabled and in step S108, a count of 10 readings to be taken for averaging is selected. In steps S110–S114, ten A/D readings are taken using the successive-approximation conversion described above to develop ten digital threshold samples stored temporarily in microcomputer memory. The ten bytes of the ten digital threshold samples are then averaged in step S116. In steps S118, the average is stored in EEPROM and calibration is complete in step S120.

This process steps S104–S120 of FIG. 5 are followed for all of the camera sensors that require calibration and provide a high-low detection output. For each particular sensor, steps peculiar to the sensed parameter or condition to establish the calibration conditions are substituted for the steps S100 and S102 of FIG. 5.

It should be noted that the event detection circuit 50 may also be used in the normal camera operating mode to provide an A/D conversion of other sensor analog output signals where the sensor output desired is a signal level, not a high/low or 1/0 result. For example, certain of the input terminals 52₀–52₇ may be coupled to auto exposure or auto focus photovoltaic area cells or array, and the event detection circuit 50 may be employed to operate simply as an A/D conversion circuit.

While there has been shown what are considered to be the preferred embodiments of the invention, it will be manifest that many changes and modifications may be made therein without departing from the essential spirit of the invention. It is intended, therefore, in the following claims to cover all such changes and modifications as may fall within the true scope of the invention.

PARTS LIST FOR FIGS. 1–5 filmstrip 10
arrow 12
leading and trailing perforation opto-sensors 14 and 16
magnetic record head 20
first image frame 22
second image frame 24
first track 25
second track 26
image frame pairs 28, 30
perforations 32, 34, 36, 38
sensor analog output signal 40
transition signal levels 42 and 44
threshold signal level 46
event detection circuit 50
sensor signal input terminals 52₀–52₇
data bus 54
switch block 56
solid state switches 56₁–56₄
input signal selector MUX 58
switch control register 60
comparator 62
A/D register 64
eight-bit threshold register 66
ladder resistance network 68
switch tree 70
switch 72
one-bit switch control register 74
A/D control register 76

I claim:

1. A calibration method for calibrating, in a camera, an event detection circuit for detecting a time varying event from the magnitude of an analog output signal of a sensor relative to a threshold analog value, the camera including an digital-to-analog converter therein, the method comprising the steps of:

in a calibration mode:
  operating said sensor to provide a test analog output signal in response to a test condition representative of the detection of an event;
  operating said digital-to-analog converter in the camera to derive a sequence of analog thresholds;
  comparing said sequence of analog thresholds with said test output analog signal to determine a calibrated analog threshold uniquely associated with said sensor
  converting said calibrated analog threshold to a digital threshold value; and
  storing the digital threshold value in camera memory; and in a normal operating mode:

selecting and operating the sensor to provide a sensor analog output signal having a magnitude varying as a function of the time varying event to be detected;

retrieving the stored digital threshold value;

converting the stored digital threshold value into said calibrated analog threshold; and comparing said sensor analog output signal to the calibrated analog threshold and providing an event detection output signal when said sensor analog output signal matches said analog threshold.

2. The method of claim 1 wherein said sensor comprises an opto-sensor for sensing perforations in a filmstrip.

3. The method of claim 1 wherein said sensor comprises a light sensor in a camera.

4. An event detection circuit in a camera for detecting a time varying event from the magnitude of an analog output signal of a sensor comprising:

means for selectively operating said event detection circuit in a calibration mode wherein said sensor is operated to provide a test analog output signal in response to a test condition representative of the event to be detected;

threshold determining means in the camera and operable in said calibration mode for determining the magnitude of the test analog output signal as a digital threshold value;

camera memory means operable in said calibration mode for storing the digital threshold value;

means for selectively operating said event detection circuit in a normal operating mode wherein said sensor is operated to provide a sensor analog output signal having a magnitude varying as a function of the presence or absence of a time varying event to be detected;

means operable in said normal operating mode for retrieving the stored digital threshold value;

digital to analog conversion means operable in said normal operating mode for converting the stored digital threshold into an analog threshold; and comparator means operable in said normal operating mode for comparing said sensor analog output signal to the analog threshold and providing an event detection output signal when said sensor analog output signal matches said analog threshold.

5. The circuit of claim 4 wherein:

said threshold determining means in said calibration mode further comprises means for successively providing test analog thresholds to said comparator means;

said comparator means is selectively operable in said calibration mode as part of said threshold determining means for successively comparing said test analog output signal to each provided test analog threshold and for determining when the test analog threshold matches the test analog output signal; and said threshold determining means in said calibration mode further comprises means including a digital-to-analog converter in the camera responsive to the determination by said comparator means that the test analog threshold matches the test analog output signal for providing the matching test analog threshold as a digital threshold value.

6. The circuit of claim 5 wherein:

said means for successively providing test analog thresholds to said comparator means further comprises:

means operable in a successive approximation for successively providing test digital thresholds; and means for successively converting said test digital thresholds to test analog thresholds; and said determination responsive means further comprises means for identifying the test digital threshold corresponding to the test analog threshold that matches the test analog output signal.

7. The circuit of claim 4 wherein said sensor comprises an opto-sensor for sensing perforations in a filmstrip.

8. The circuit of claim 4 wherein said sensor comprises a light sensor in the camera.

9. An event detector circuit in a camera for detecting the analog signal output of a sensor comprising:

a comparator having first and second input terminals and an output terminal;

means for providing a test analog output signal from said sensor to said first terminal of said comparator in a sensor self calibration mode and a sensor analog output signal in a normal mode of operation following calibration of said sensor;

means for operating said providing means and said comparator in said self calibration mode under calibration test conditions of operation of said sensor further comprising:

means for providing a series of test analog thresholds to said second input terminal;

means for detecting a match of said test analog output signal with one of said a test analog thresholds;

means responsive to a detected match for storing the matching test analog threshold as a digital threshold; and means for operating said providing means and said comparator in said normal operating mode under normal event detection conditions further comprising:

means for converting said digital threshold to an analog threshold;

means for applying said analog threshold to said second input terminal of said comparator; and means for operating said comparator to provide an event detect signal upon detection of a match of said sensor analog output signal to said analog threshold.

10. The circuit of claim 9 wherein:

said threshold determining means in said calibration mode further comprises means for successively providing test analog thresholds to said comparator means;

said comparator means is selectively operable in said calibration mode as part of said threshold determining means for successively comparing said test analog output signal to each provided test analog threshold and for determining when the test analog threshold matches the test analog output signal; and said threshold determining means in said calibration mode further comprises means responsive to the determination by said comparator means that the test analog threshold matches the test analog output signal for providing the matching test analog threshold as a digital threshold.

11. The circuit of claim 10 wherein:

said means for successively providing test analog thresholds to said comparator means further comprises:

means operable in a successive approximation for successively providing test digital thresholds; and means for successively converting said test digital thresholds to test analog thresholds; and said determination responsive means further comprises means for identifying the test digital threshold corresponding to the test analog threshold that matches the test analog output signal.

12. The circuit of claim 9 wherein said sensor comprises an opto-sensor for sensing perforations in a filmstrip.

13. The circuit of claim 9 wherein said sensor comprises a light sensor in the camera.

* * * * *